(12) United States Patent
Fakih

(10) Patent No.: US 10,447,200 B1
(45) Date of Patent: Oct. 15, 2019

(54) SOLAR PHOTOVOLTIAC CELL SYSTEM

(71) Applicant: Ali A. Fakih, Bakersfield, CA (US)

(72) Inventor: Ali A. Fakih, Bakersfield, CA (US)

( * ) Notice: Subject to any disclaimer, the term of this patent is extended or adjusted under 35 U.S.C. 154(b) by 66 days.

(21) Appl. No.: 15/818,116

(22) Filed: Nov. 20, 2017

(51) Int. Cl.
*H01L 31/052* (2014.01)
*H02S 40/34* (2014.01)
*H02S 40/22* (2014.01)
*H02S 40/10* (2014.01)
*H02S 40/32* (2014.01)
*H02S 40/42* (2014.01)
*H02S 40/44* (2014.01)
*F24D 17/00* (2006.01)
*H02S 40/38* (2014.01)
*F24S 30/425* (2018.01)
*H02J 7/35* (2006.01)

(52) U.S. Cl.
CPC .......... *H02S 40/34* (2014.12); *F24D 17/0021* (2013.01); *F24S 30/425* (2018.05); *H02S 40/10* (2014.12); *H02S 40/22* (2014.12); *H02S 40/32* (2014.12); *H02S 40/38* (2014.12); *H02S 40/425* (2014.12); *H02S 40/44* (2014.12); *H02J 7/35* (2013.01)

(58) Field of Classification Search
CPC .......... H02S 40/34; H02S 40/10; H02S 40/22; H02S 40/32; H02S 40/38; H02S 40/425; H02S 40/44; F24S 30/425; F24D 17/0021
See application file for complete search history.

(56) References Cited

U.S. PATENT DOCUMENTS

| | | | | |
|---|---|---|---|---|
| 8,193,440 B1* | 6/2012 | Hajjar | ..................... | H01L 35/30 136/206 |
| 2011/0100429 A1* | 5/2011 | Mughal | ................. | H01L 31/052 136/246 |
| 2011/0226308 A1* | 9/2011 | Pang | ....................... | H02S 20/00 136/246 |
| 2012/0051724 A1* | 3/2012 | Abraham | ................ | F24H 1/122 392/441 |
| 2012/0152319 A1* | 6/2012 | Bailey | ..................... | H02S 40/44 136/248 |
| 2012/0192922 A1* | 8/2012 | Waring | ............... | H01L 31/0547 136/248 |
| 2015/0096551 A1* | 4/2015 | Fakih | ...................... | F24S 50/20 126/600 |
| 2017/0114941 A1* | 4/2017 | Farkas | .................... | F16L 58/00 |

* cited by examiner

*Primary Examiner* — Jayne L Mershon
(74) *Attorney, Agent, or Firm* — Edwin H. Crabtree; Ramon L. Pizarro

(57) ABSTRACT

A solar photovoltaic cell system used for supply of electrical power for various uses. The cell system includes photovoltaic cells received around a tubular shaped, elongated tank. The tank is disposed in front of a concave light reflector. The light reflector is rotatably mounted on a latitude adjustable stand. The stand is also used to hold opposite ends of the tank. The light reflector is used for reflecting increased sun light onto the photovoltaic cells. Electrical energy from the photovoltaic cells is used to power various types of electrical applications.

18 Claims, 2 Drawing Sheets

SOLAR PHOTOVLTIAC CELL SYSTEM

BACKGROUND OF THE INVENTION

(a) Field of the Invention

This invention relates to the use of a solar photovoltaic cell system for producing electrical power to be used for heating water, charging batteries and other applications. The system includes photovoltaic cells received around an elongated, tubular, water storage tank, electrical storage tank or electrical tank. The tank is received next to a concave light reflector rotatably mounted on a stand. The light reflector is used for reflecting increased light rays onto the cells on the tank. The cell system can be installed on building walls, roofs, poles, ground surface, or similar applications. Also, the cell system can be installed on residential, commercial and industrial buildings.

SUMMARY OF THE INVENTION

In view of the foregoing, it is a primary objective of the subject invention to provide an inexpensive, light weight, self cleaning to improve efficiency, less use of real estate, less installation cost, no need for a recirculation pump, heat recovery coil and cells cooling and a highly efficient insulated system for various electrical uses.

Another object of the invention is the solar photovoltaic cell system can be easily installed on various types of buildings with a latitude adjustment stand for making maximum use of sun ray reflection on the cells.

In another embodiment of the invention, a solar photovoltaic cell system can be used for heating water, charging a series of batteries, and various other electrical uses.

The solar photovoltaic cell system includes photovoltaic cells received around an insulated tubular shaped, elongated water storage tank. The tank is disposed in front of a concave light reflector. The light reflector is connected to the water storage tank rotatably mounted on a stand. The stand is also used to hold opposite ends of the water storage tank.

The solar photovoltaic cell system includes photovoltaic cells received around an insulated tubular shaped, elongated electrical storage tank. The tank is disposed in front of a concave light reflector. The light reflector is connected to the electrical storage tank rotatably mounted on a stand. The stand is also used to hold opposite ends of the electrical storage tank.

These and other objects of the present invention will become apparent to those familiar with solar collectors, when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject solar photovoltaic cell system and in which.

DETAILED DESCRIPTION OF THE PREFERRED EMBODIMENTS

Figure 1A:
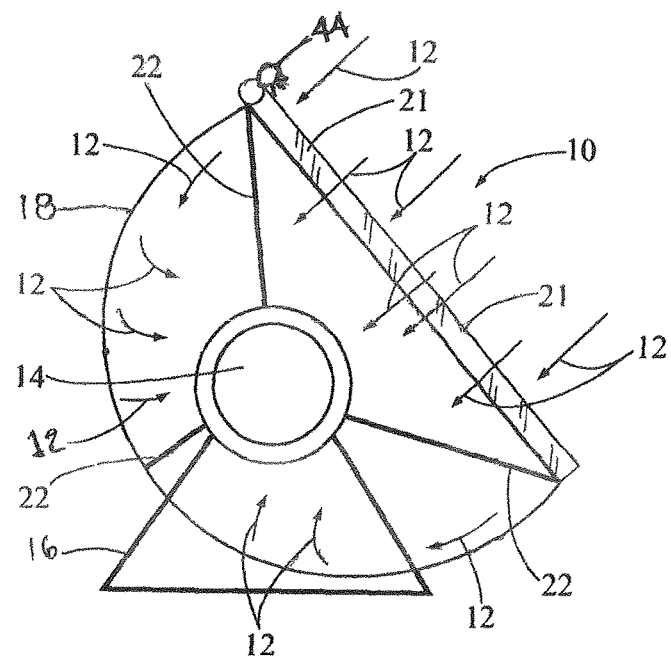
FIG. 1A illustrates a side view of a solar photovoltaic cell system mounted on a latitude adjustment stand and facing the sun for receiving sun rays.

In FIG. 1A, a side view of the solar photovoltaic cell system is shown having a general reference numeral 10 for receiving sun rays 12 thereon. An elongated, tubular water storage tank 14 is shown mounted on a latitude adjustment stand 16. The stand 16 also supports a concave, light reflector 18. The stand 16 also includes side reflector supports 22 to hold the reflector on the stand. The light reflector 18 includes a glass cover 21 received on the top and the sides of the reflector. Both ends of the tank 14 are mounted on the stand 16. Also the light reflector 18 is rotatably mounted on the stand for allowing the light reflector 18 to be adjusted to the latitude of the sun, as shown in the drawings.

The water storage tank 14 is characterized by having photovoltaic cells 26 wrapped around the tank for receiving the sun rays 12 and converting this solar energy into electrical energy. The cells 26 are shown in FIG. 1B.

Figure 1B:
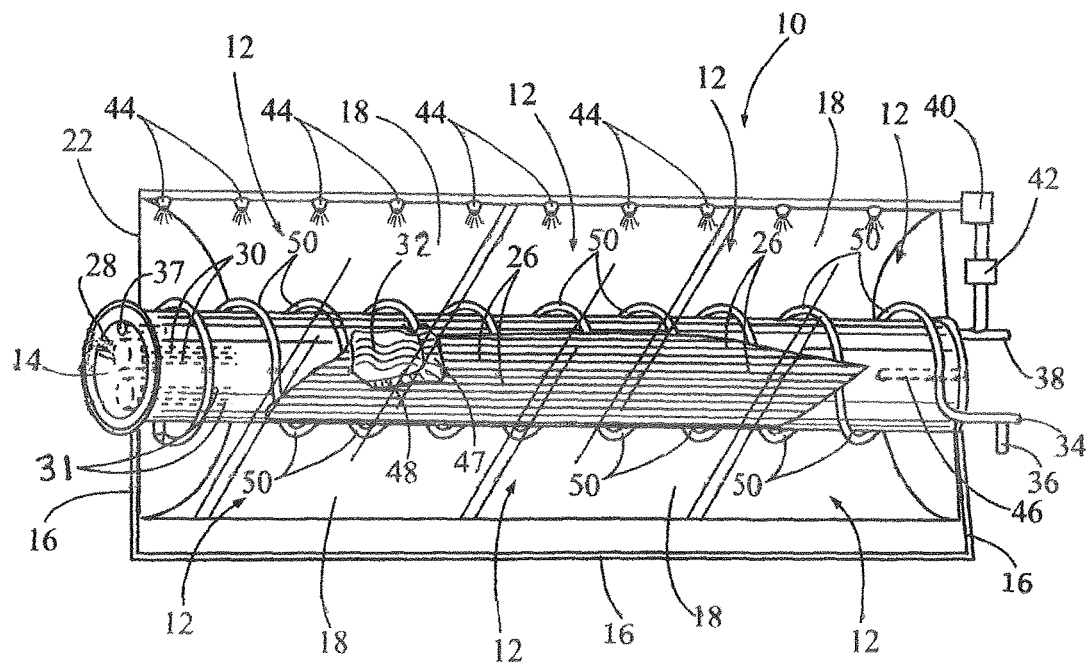
FIG. 1B is a front view of the solar photovoltaic cell system shown in FIG. 1A. In this drawing, the cell system is used for producing electrical power and heating water inside the water storage tank.

In FIG. 1B, a front view of the solar cell system 10 is shown with the photovoltaic cells 26 wrapped around the tubular insulated water storage tank 14. The tank is shown mounted on the stand 16 and centered along a length of the light reflector 18.

In this embodiment, the cells 26 are connected to photovoltaic cell wiring 28. The wiring 28 is connected to electrical water heaters 30 mounted inside the water storage tank 14. A backup electrical water heater 31 with thermostat can be used during inclement weather and powered by a utility power, or a windmill power source.

In this drawing, a portion of the water storage tank 14 is shown cutaway to illustrate heated water, shown as 32, being circulated through the tank and insulation 47 and reflective film 48. Also shown in this drawing is a cold water inlet 34, with a cold water thermometer 36 and a hot water thermometer 37 for displaying the temperatures of the water 32 inside the tank.

A hot water outlet 38 is shown at the end of the water storage tank 14 for discharging heated water. As an added feature to the system, a nozzle valve and control box 40 and a pressure relief value 42 are connected to the hot water outlet 38. The nozzle valve and control box 40 are connected to a series of water cleaning spray nozzles 44 to clean the glass cover and to improve the efficiency of the cell system 10.

Also, another added feature of the system 10 is a magnesium rod 46, shown in dashed lines. The rod 46 is inserted inside the water storage tank 14 to prevent corrosion. Further shown in this drawing is the insulation 47 and the heat reflective film 48 used to prevent heat loss inside the water storage tank 14. The system 10 also includes a heat recovery coil 50 wrapped around the insulation 47 and over the reflective film 48 and under the photovoltaic cells 26 for heat recovery and heating the cold water 32 and cooling the photovoltaic cells 26 to improve efficiency.

Figure 2A:
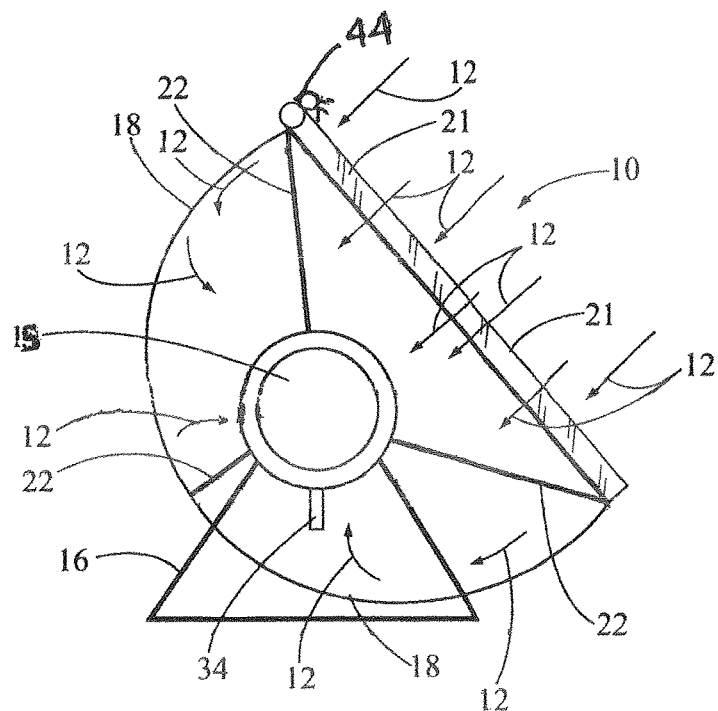
FIG. 2A illustrates another side view of a solar photovoltaic cell system mounted on a latitude adjustment stand and facing the sun for receiving sun rays.

In FIG. 2A, another embodiment of the invention is shown as a side view of the solar photovoltaic cell system 10, similar to FIG. 1A, and facing an angle of the sun for receiving the sun rays 12. In this drawing, an elongated, tubular electrical storage tank 15 is shown supported on the stand 16. The electrical storage tank 15 is similar in structure and design to the water storage tank 14. The stand 16 supports the concave, light reflector 18 with side, supports 22. As mentioned above, the photovoltaic cells 26 are used for receiving the sun rays 12 and converting the solar energy to electrical energy.

Figure 2B:
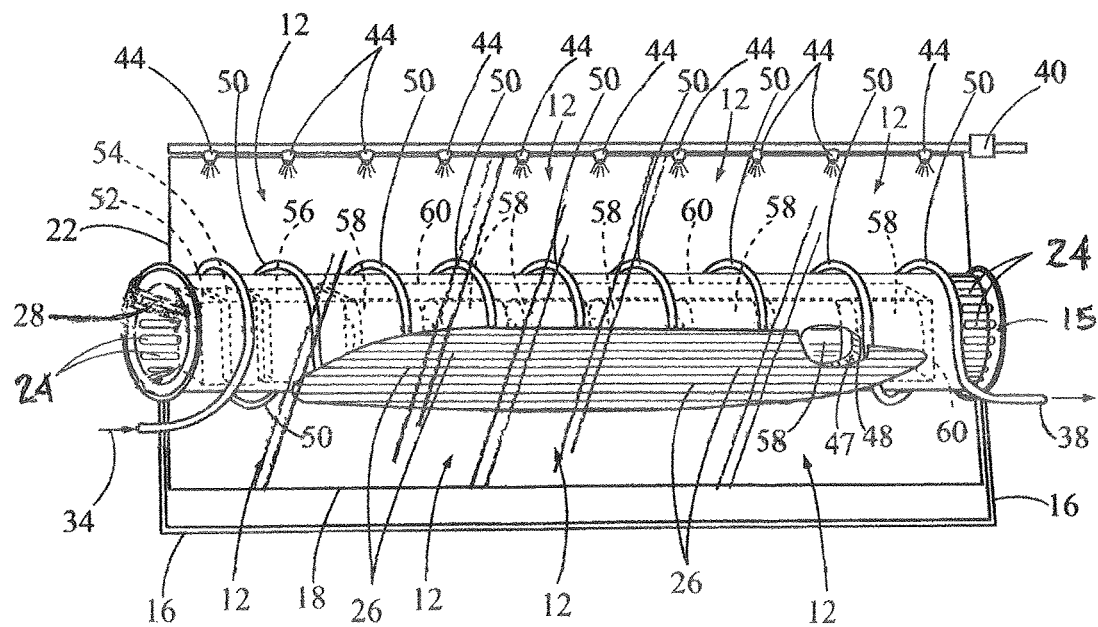
FIG. 2B is a front view of the solar photovoltaic cell system shown in FIG. 2A In this drawing, the cell system is used for producing electrical power and storing the electrical energy in the batteries inside an electrical storage tank.

In FIG. 2B, a front view of the solar cell system 10 is shown. In this view, electrical wiring 28 is connected to the photovoltaic cells 26. The wiring 28 is connected to a battery charger 56 for charging a series of batteries 58. An inverter 54 receives DC power from the batteries 58 and converts the DC power to AC power. The invertor 54 is connected to a connection box 52 for electrical uses. A ventilation cover 24 is located on both ends of an electrical system tray 60 for cooling. The electrical system tray 60, with connection box 52, inverter 54 and battery charger 56 with batteries 58, are shown inside the electrical storage tank 15. In this manner, the electrical system tray 60 is used for receiving electrical power form the photovoltaic cells 26 and charging the batteries 58 for various electrical uses.

The cell system 10 also includes the water cleaning spray nozzles 44 with the nozzle valve and the control box 40 powered from the connection box 52 and used for cleaning the glass cover 21. Further, the cell system in this drawing includes the water inlet 34, the water outlet 38, and the coil 50, the coil 50 is mounted over insulation 47 and over a reflective film 48 and under the photovoltaic cells. 26 for cooling the photovoltaic cells 26 to improve efficiency. In this drawing, a portion of the electrical storage tank 15 is shown cutaway to illustrate batteries 58, the insulation 47 and the reflective film 48.

While the invention has been particularly shown, described and illustrated in detail with reference to a solar photovoltaic cell system, it should be understood by those skilled in the art that equivalent changes in form and detail may be made therein without departing from the true spirit and scope of the invention as claimed except as precluded by the prior art.

The embodiments of the invention for which an exclusive privilege and property right are claimed are defined as follows:

1. A solar photovoltaic cell system used for converting sun light to electrical energy, the cell system comprising;
   photovoltaic cells received around a hollow, tubular shaped, elongated, water storage tank, the cells connected to electrical wiring, the wiring adapted for connecting to various uses of electrical power produced by the cells, the water storage tank includes insulation and a reflective film
   a concave light reflector, the light reflector disposed around the back and the sides of the photovoltaic cells, the light reflector adapted for reflecting increased sun light onto the photovoltaic cells; and
   a latitude adjustment stand, the light reflector rotatably mounted on the latitude adjustment stand, the stand used to hold opposite ends of the water storage tank next to the light reflector.

2. The cell system as described in claim 1 wherein the water storage tank includes a cold water inlet and a hot water outlet for circulating water inside the water storage tank.

3. The cell system as described in claim 2 wherein the cold water inlet includes a cold water thermometer and the tank includes a hot water thermometer.

4. The cell system as described in claim 1 wherein the light reflector includes a glass cover received on the top and the sides of the reflector.

5. The cell system as described in claim 4 wherein the light reflector includes water cleaning spray nozzles, a nozzle valve, and a control box, the spray nozzles used for cleaning the glass to improve the efficiency of the system.

6. The cell system as described in claim 5 further including a pressure relief valve connected to the nozzle valve and the control box.

7. The cell system as described in claim 1 further including a magnesium rod received inside the water storage tank for preventing corrosion inside the tank.

8. The cell system as described in claim 1 further includes an electrical water heater received inside the storage tank and connected to the wiring for heating the water received inside the storage tank.

9. The cell system as described in claim 1 further including a heat recovery coil received around the storage tank, the coil used for heating the inlet water and cooling the cells to improve efficiency.

10. A solar photovoltaic cell system used for converting sun light to electrical energy, the cell system comprising;
    photovoltaic cells received around a hollow, tubular shaped, elongated electrical storage tank, the cells connected to electrical wiring, the wiring adapted for connecting to various uses of electrical power produced by the cells, the electrical storage tank includes insulation and a reflective film;
    a concave light reflector, the light reflector disposed around the back and the sides of the electrical storage tank, the light reflector adapted for reflecting increased sun light onto the photovoltaic cells; and
    a latitude adjustment stand, the light reflector rotatably mounted on the stand, the stand used to hold opposite ends of the electrical storage tank next to the light reflector.

11. The cell system as described in claim 10 further including a connection box, an inverter, a battery charger, and a series of batteries received inside the electrical storage tank and connected to the electrical wiring for storing electrical power received from the photovoltaic cells.

12. The cell system as described in claim 10 wherein the electrical storage tank further includes a cooling coil, the cooling coil used for cooling the cells to improve efficiency of the system.

13. The cell system as described in claim 12 further including a water inlet and a water outlet connected to the cooling coil for circulating water inside the coil.

14. The cell system as described in claim 10 wherein the light reflector includes a glass cover received on a top and sides of the reflector.

15. The cell system as described in claim 14 wherein the light reflector includes water cleaning spray nozzles, a nozzle valve and a control box, the spray nozzles used for cleaning the glass cover to improve efficiency of the system.

16. The cell system as described in claim 10 wherein the electrical storage tank includes a ventilation cover on both sides of the electrical storage tank for cooling.

17. A solar photovoltaic cell system used for converting sun light to electrical energy, the cell system comprising;
    photovoltaic cells received around a hollow, tubular shaped, elongated tank, the cells connected to electrical wiring, the wiring adapted for connecting to various uses of electrical power produced by the cells, the tank includes insulation and a reflective film;

a concave light reflector, the light reflector disposed around the back and the sides of the tank, the light reflector adapted for reflecting increased sun light onto the photovoltaic cells; and a latitude adjustment stand, the light reflector rotatably mounted on the stand, the stand used to hold opposite ends of the tank next to the light reflector.

18. The cell system as described in claim 17 wherein the light reflector includes a glass cover received on a top and sides of the reflector, also, the light reflector includes water cleaning spray nozzles, a nozzle valve and a control box, the spray nozzles used for cleaning the glass cover to improve efficiency of the system.

* * * * *